(12) United States Patent
Liu et al.

(10) Patent No.: US 11,023,545 B2
(45) Date of Patent: Jun. 1, 2021

(54) METHOD AND DEVICE FOR DISPLAYING RECOMMENDED CONTENTS

(71) Applicant: BAIDU ONLINE NETWORK TECHNOLOGY (BEIJING) CO., LTD., Beijing (CN)

(72) Inventors: Lu Liu, Beijing (CN); Peng Li, Beijing (CN); Tao Zhang, Beijing (CN); Wei Li, Beijing (CN); Jingjing Sun, Beijing (CN); Chengshuai Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 270 days.

(21) Appl. No.: 15/740,032

(22) PCT Filed: Jul. 14, 2016

(86) PCT No.: PCT/CN2016/090042
§ 371 (c)(1),
(2) Date: Dec. 27, 2017

(87) PCT Pub. No.: WO2017/161784
PCT Pub. Date: Sep. 28, 2017

(65) Prior Publication Data
US 2018/0189405 A1     Jul. 5, 2018

(30) Foreign Application Priority Data

Mar. 21, 2016   (CN) .......................... 201610160756.1

(51) Int. Cl.
*G06F 16/30* (2019.01)
*G06F 16/9535* (2019.01)
(Continued)

(52) U.S. Cl.
CPC .... *G06F 16/9535* (2019.01); *G06F 16/90324* (2019.01); *H04L 67/02* (2013.01)

(58) Field of Classification Search
CPC . H04L 67/02; G06F 16/90324; G06F 16/9535
(Continued)

(56) References Cited

U.S. PATENT DOCUMENTS

2002/0082929 A1* 6/2002 Wang ..................... G06Q 20/04
                                                           705/27.1
2008/0147630 A1* 6/2008 Chu ....................... G06F 16/285
(Continued)

FOREIGN PATENT DOCUMENTS

CN          101324948          12/2008
CN          101968802          2/2011
(Continued)

OTHER PUBLICATIONS

WIPO, ISR for PCT/CN2016/090042, dated Dec. 26, 2016.
SIPO, Office Action for CN App. No. 201610160756, dated Jan. 12, 2017.

*Primary Examiner* — Kuen S Lu
(74) *Attorney, Agent, or Firm* — Hodgson Russ LLP

(57) ABSTRACT

A method for displaying recommendation contents, an electronic device and a non-transitory computer storage medium are provided. The method includes: receiving a first query input by a user, and acquiring candidate query results corresponding to the first query; selecting, from the candidate query results, a preset number of candidate query results as recommendation results, and displaying the recommendation results on a search result page; receiving a first instruction, and acquiring attribute information of the user, in which the first instruction represents an instruction to acquire an information stream input by the user on the search result page; and acquiring information stream results corresponding to the attribute information of the user, and skipping from the search result page to an information stream page, so as to display the information stream results on the information stream page.

15 Claims, 7 Drawing Sheets

--- after the preset number of candidate query results are selected from the candidate query results as recommendation results, the specific webpages corresponding to the recommendation results are acquired from the server    — S61 after the information stream results corresponding to the attribute information of the user are acquired, the specific webpages corresponding to the information steam results are acquired from the server    — S62

(51) Int. Cl.
*G06F 16/9032* (2019.01)
*H04L 29/08* (2006.01)

(58) Field of Classification Search
USPC .......................................... 707/722
See application file for complete search history.

(56) References Cited

U.S. PATENT DOCUMENTS

| | | |
|---|---|---|
| 2009/0259646 A1 | 10/2009 | Fujita et al. |
| 2009/0282022 A1 | 11/2009 | Bennett |
| 2013/0290339 A1* | 10/2013 | LuVogt .................. G06Q 10/10 707/740 |
| 2015/0046446 A1* | 2/2015 | Gannu ................ G06F 16/9535 707/734 |
| 2015/0254714 A1* | 9/2015 | Zhuang ............... G06F 16/3322 705/14.54 |
| 2016/0078136 A1 | 3/2016 | Nijjer |

FOREIGN PATENT DOCUMENTS

| | | |
|---|---|---|
| CN | 102779136 | 11/2012 |
| CN | 103177021 | 6/2013 |
| CN | 103927354 | 7/2014 |
| CN | 105117452 | 12/2015 |
| CN | 105205137 | 12/2015 |

\* cited by examiner

METHOD AND DEVICE FOR DISPLAYING RECOMMENDED CONTENTS

CROSS REFERENCE TO RELATED APPLICATION

This application is a U.S. National phase application of an International Application No. PCT/CN2016/090042, filed on Jul. 14, 2016, which is based upon and claims a priority to Chinese Patent Application Serial No. 201610160756.1, filed with the Status Intellectual Property Office of P. R. China on Mar. 21, 2016, titled "Method and device for displaying recommended contents", filed by BAIDU ONLINE NETWORK TECHNOLOGY (BEIJING) CO., LTD., the entire contents of which are incorporated herein by reference.

FIELD

The present disclosure relates to an internet technology field, and more particularly to a method and an apparatus for displaying recommendation contents.

BACKGROUND

With a development of internet search technology, an increasing number of users search for information in a search engine of an electronic device.

In related arts, an information collection card and relative nature results related to a query may be displayed for the user via an information-type search result page, such that the user's demand for viewing the information relative to the query may be satisfied. Landing page selected and clicked from the search result page is generally a third-party website publishing the information, such that there may be a problem of a low-loading speed and inconsistent experiences of the landing pages. When the user desires to view other information continuously, the user needs to input a query in the search box again, leading to a separate and incoherent viewing process and a poor user experience.

SUMMARY

Embodiments of the present disclosure seek to solve at least one of the problems existing in the related art to at least some extent.

Accordingly, an objective of the present disclosure is to provide a method for displaying recommendation contents. Another objective of the present disclosure is to provide an apparatus for displaying recommendation contents.

In order to achieve the above objectives, embodiments of a first aspect of the present disclosure provide a method for displaying recommendation contents. The method includes: receiving a first query input by a user, and acquiring candidate query results corresponding to the first query; selecting, from the candidate query results, a preset number of candidate query results as recommendation results, and displaying the recommendation results on a search result page; receiving a first instruction, and acquiring attribute information of the user, in which the first instruction represents an instruction to acquire an information stream input by the user on the search result page; and acquiring information stream results corresponding to the attribute information of the user, and skipping from the search result page to an information stream page, so as to display the information stream results on the information stream page.

In order to achieve the above objectives, embodiments of a second aspect of the present disclosure provide an apparatus for displaying recommendation contents. The apparatus includes: a query result acquiring module, configured to receive a first query input by a user, and to acquire candidate query results corresponding to the first query; a recommendation result selecting module, configured to select, from the candidate query results, a preset number of candidate query results as recommendation results, and to display the recommendation results on a search result page; a first instruction receiving module, configured to receive a first instruction, and to acquire attribute information of the user, in which the first instruction represents an instruction to acquire an information stream input by the user on the search result page; and an information stream result acquiring module, configured to acquire information stream results corresponding to the attribute information of the user, and to skip from the search result page to an information stream page, so as to display the information stream results on the information stream page.

Embodiments of the present disclosure also provide an electronic device, including: one or more processors; a memory; one or more programs stored in the memory, when executed by the one or more processors, configured to perform the method according to any embodiment of the first aspect of the present disclosure.

Embodiments of the present disclosure also provide a non-transitory computer storage medium for storing one or more modules, when the one or more modules are executed, configured to perform the method according to any embodiment of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
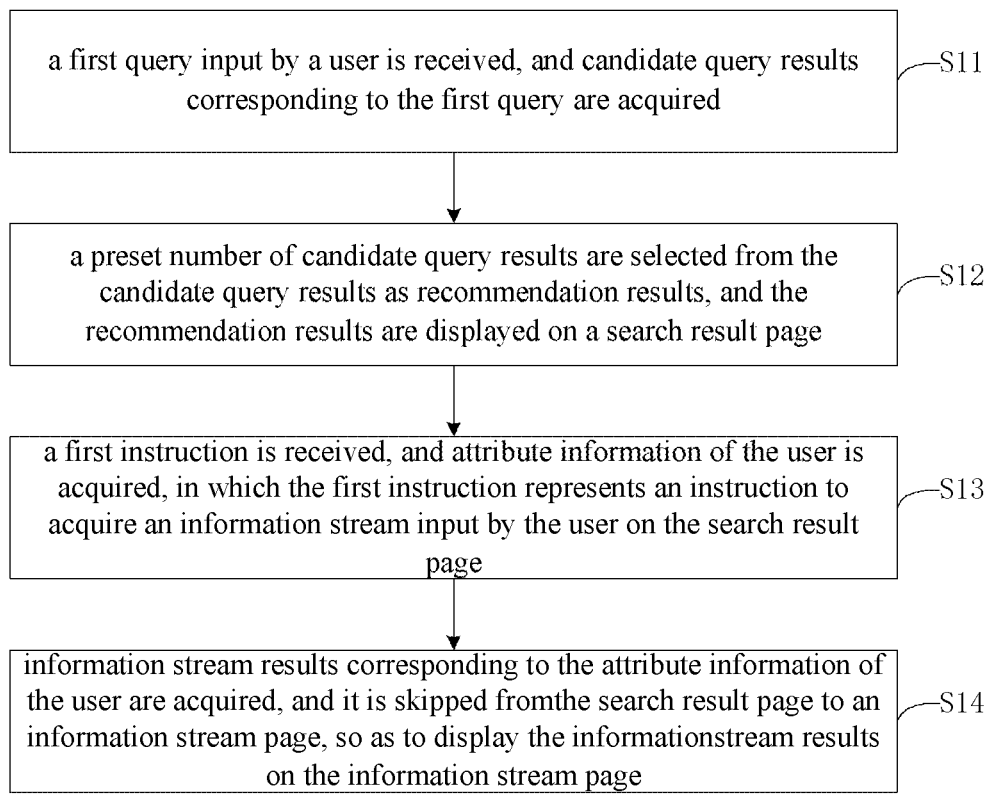
FIG. 1 is a flow chart of a method for displaying recommendation contents according to an embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

FIG. 1 is a flow chart of a method for displaying recommendation contents according to an embodiment of the present disclosure.

The method according to this embodiment may be applied in a search engine.

Search Engine is defined as a system which can receive a query input by a user, collect information related to the query from the Internet, and provide searching service for the user and display the information related to the query to the user after performing the information organization and processing.

Alternatively, the search engine in embodiments of the present disclosure may run on an electronic device.

The electric device may be a PC (personal computer), a cloud device or a mobile device (such as a smart phone or a tablet, etc.).

As shown in FIG. 1, the method includes the following acts.

At block S11, a first query input by a user is received, and candidate query results corresponding to the first query are acquired.

The user may input the first query in a search box of a search engine. For example, referring to FIG. 2, a page including a search box 21, a query 22, recommendation results 23, an operating area 24 and a preset button 25 is illustrated. The user may input "Ni Ping has an art exhibition in Canada" in the search box. Alternatively, referring to FIG. 3, a page including a search box 31, a query 32, recommendation results 33, an operating area 34 and a preset button 35 is illustrated. The user may also input "commemorative coins of Chinese zodiac monkey are issued" in the search box.

In embodiments of the present disclosure, the candidate query results corresponding to the first query are collected from a server by the search engine using a certain strategy and specific computer program and related to the first query. The number of the candidate query results may be one or at least two. It may be understood that there are more than one candidate query result because of various information on the internet.

After the query is input by the user, the search engine may transmit the query to a background system, in which the background system may be a search engine server. Candidate query results related to the query may be retrieved in a database of the server after the query is received by the search engine server. For example, a preset number of pieces of news starting with the query may be retrieved from the database of the server as the candidate query results. The preset number may be 100, for example.

The database of the server is pre-established, for example, in a statistic way. For example, search behaviors of users on the search engine may be counted by background crews, and the candidate query results which are searched for many times may be stored in the database. Alternatively, the database may be established in a machine learning method. For example, a webpage related technology such as spider technology may be used, such that the candidate query results which are searched for many times may be obtained from the webpages and stored in the database.

Figure 2:
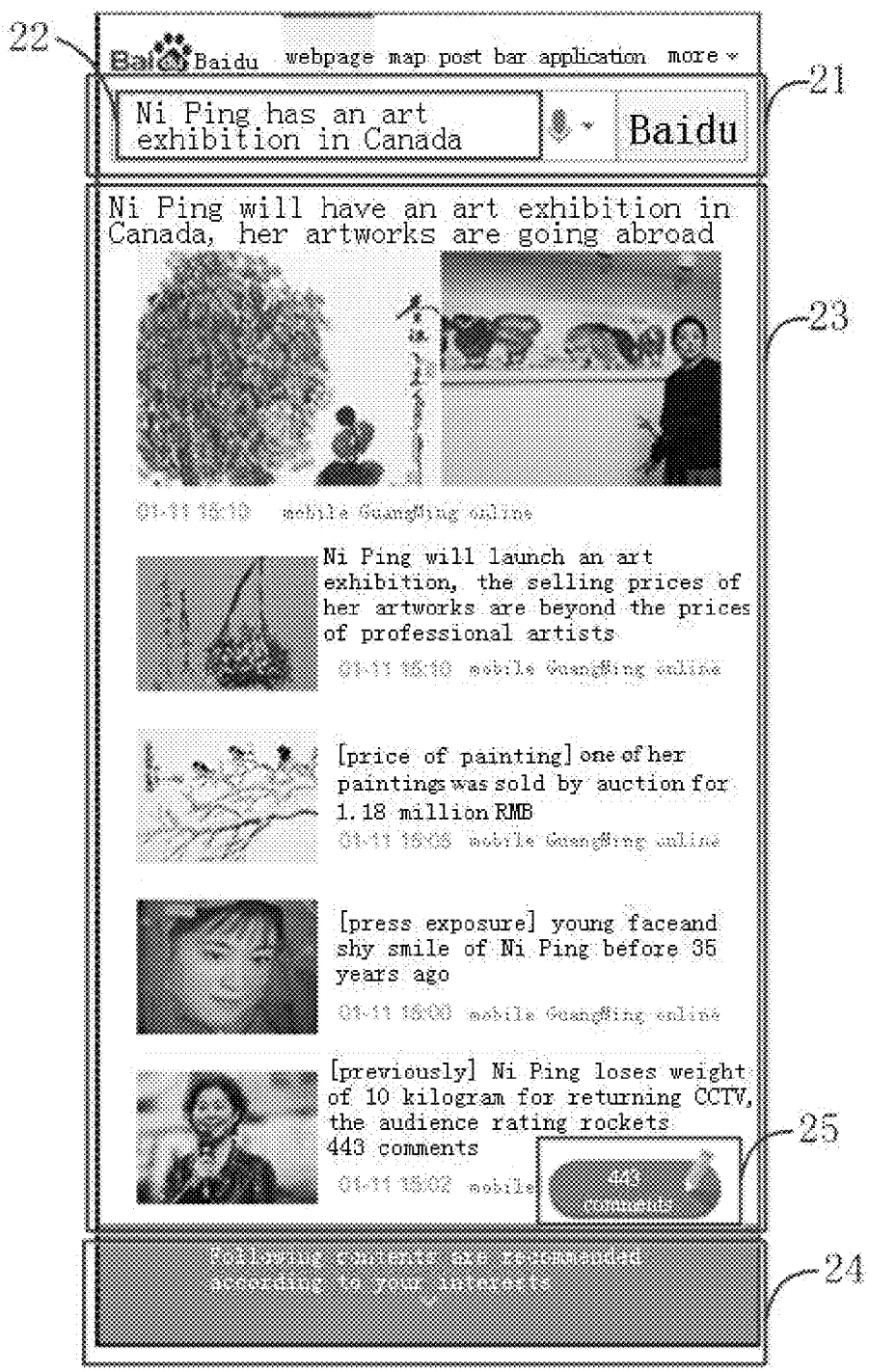
FIG. 2 is a schematic diagram of a search page in a search engine according to an embodiment of the present disclosure.

As shown in FIG. 2, when the query "Ni Ping has an art exhibition in Canada" is input, the corresponding candidate query results may include a piece of news "Ni Ping will have an art exhibition in Canada, her artworks are going abroad", a piece of news "Ni Ping will launch an art exhibition, the selling prices of her artworks are beyond the prices of professional artists" and the like.

At block S12, a preset number of candidate query results are selected from the candidate query results as recommendation results, and the recommendation results are displayed on a search result page.

In embodiments of the present disclosure, the number of the recommendation results displayed on the search result page may be preset in the search engine by the user. Alternatively, the number of the recommendation results may be set by a developer of the search engine. For example, the number may be set as five.

For example, 100 candidate query results may be ordered by the search engine according to relevance between the 100 candidate query results and the query. The order manner may be a descending order according to the relevance, and five candidate query results may be selected from the ordered candidate query results as the recommendation results. The recommendation results may be displayed on the search result page in a descending order according to the relevance. The ordering manner may be realized according to relative techniques, which will not be described in detail herein.

Referring to FIG. 2, the query "Ni Ping has an art exhibition in Canada" is input, five recommendation results may be acquired in a descending order according to the relevance between the five recommendation results and the query, which are 1) a piece of news "Ni Ping will have an art exhibition in Canada, her artworks are going abroad"; 2) a piece of news "Ni Ping will launch an art exhibition, the selling prices of her artworks are beyond the prices of professional artists"; 3) a piece of news "[price of painting] one of her paintings was sold by auction for 1.18 million RMB"; 4) a piece of news "[press exposure] young face and shy smile of Ni Ping before 35 years ago"; 5) a piece of news "[previously] Ni Ping loses weight of 10 kilogram for returning CCTV, the audience rating rockets". Alternatively, the user may slide down in the operating area 24 as shown in FIG. 2, so as to acquire more candidate query results.

Figure 3:
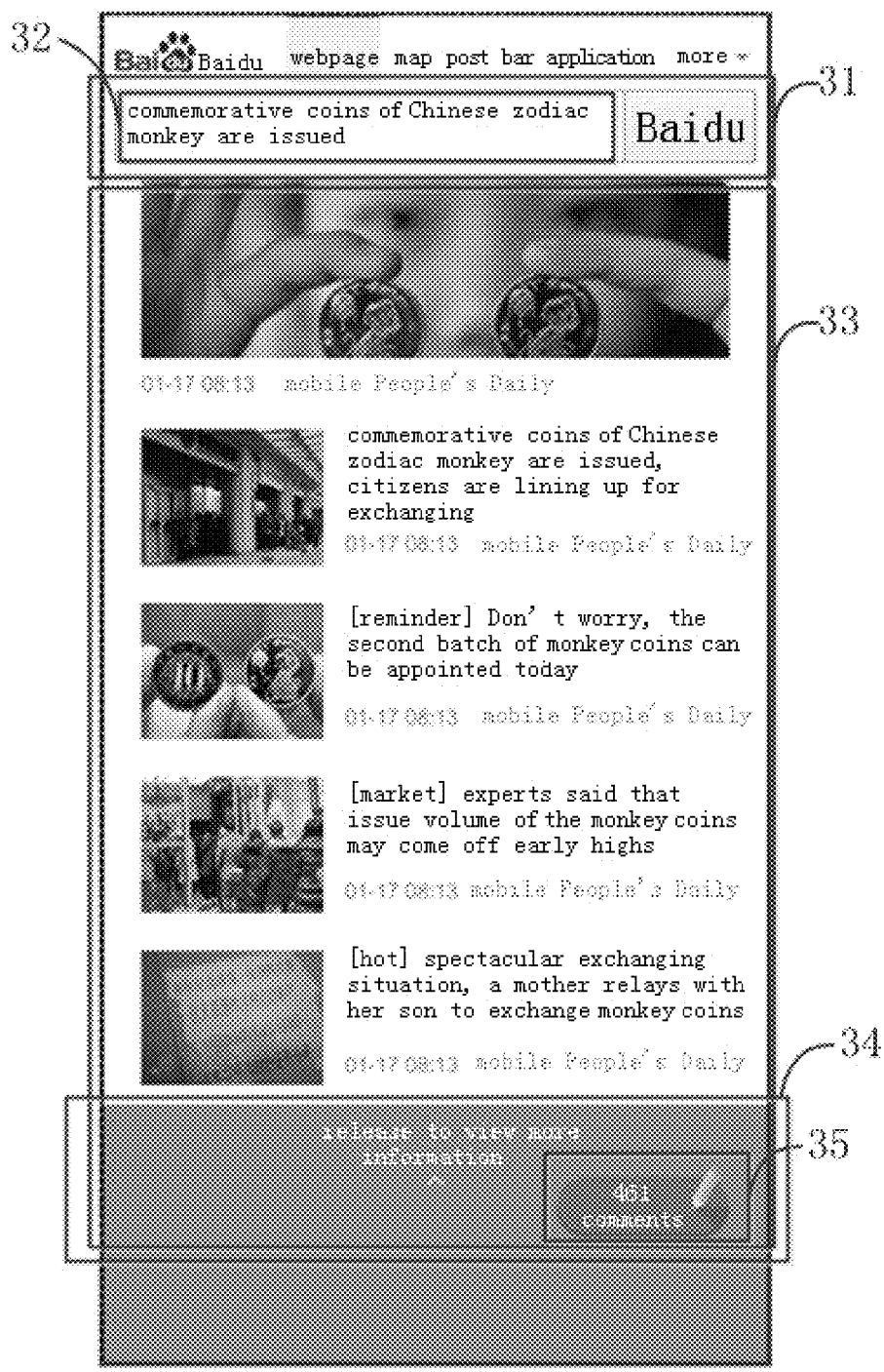
FIG. 3 is a schematic diagram of a search page in a search engine according to another embodiment of the present disclosure.

Referring to FIG. 3, in a case of inputting the query "commemorative coins of Chinese zodiac monkey are issued", five recommendation results are acquired and displayed in a descending order according to the relevance with the query.

At block S13, a first instruction is received, and attribute information of the user is acquired, in which the first instruction represents an instruction to acquire an information stream input by the user on the search result page.

In embodiments of the present disclosure, as shown in FIG. 3, the first instruction may represent an instruction triggered by the user according to a preset control method via the operating area 34. For example, the preset control method may be an upward-sliding operation on the operation area 34, a downward-sliding operation on the operation area 34, or a clicking operation on the operation area 34 and the like, which will not be limited herein. When the user performs an upward-sliding operation on the operation area 34, the search engine is triggered to receive the first instruction. Further, block S14 is triggered.

At block S14, information stream results corresponding to the attribute information of the user are acquired, and it is skipped from the search result page to an information stream page, so as to display the information stream results on the information stream page.

Different users may have different attribute information, causing that different information stream results may be acquired for a same query when different users perform a searching, especially in an electronic commerce searching. In order to provide personalized service, the corresponding information stream results may be acquired according to the user's attribute information. Specifically, a statistical analysis may be performed on correspondences between different attribute information and information steam results by a background staff according to a searching behavior of the user corresponding to a specific attribute. The analyzing results may be recorded in the database of the server. For example, gender, age or occupation of the user may be regarded as different attribute information. The specific manner for classifying the attribute information may be preset. For example, the attributes of the user may be classified according to the occupation. After that, corresponding information stream results may be recommended for each user and displayed on the information steam page, thereby providing a personalized information stream results to each user.

Figure 4:
FIG. 4 is a schematic diagram of an information stream result page according to an embodiment of the present disclosure.

Referring FIG. 4, FIG. 4 is a schematic diagram of an information stream result page according to an embodiment of the present disclosure. The information stream results may include current news, hot news, entertainment news and the like the user pays attention to. The specific displaying contents may be predetermined by the user according to the user's preference. Further, the information stream results may be displayed with or without a figure, or displayed with more than one figure. In embodiments of the present disclosure, the style of the information stream result page may be uniformed, which may improve the user viewing experience effectively. Alternatively, the user may click one information stream result, and the current page may be redirected to a corresponding specific webpage from the information stream page. In addition, since there are various content displayed on the information steam result page, the user may view not only the contents on the traditional third-party news website, but also various original works designed by user generated media.

Figure 5:
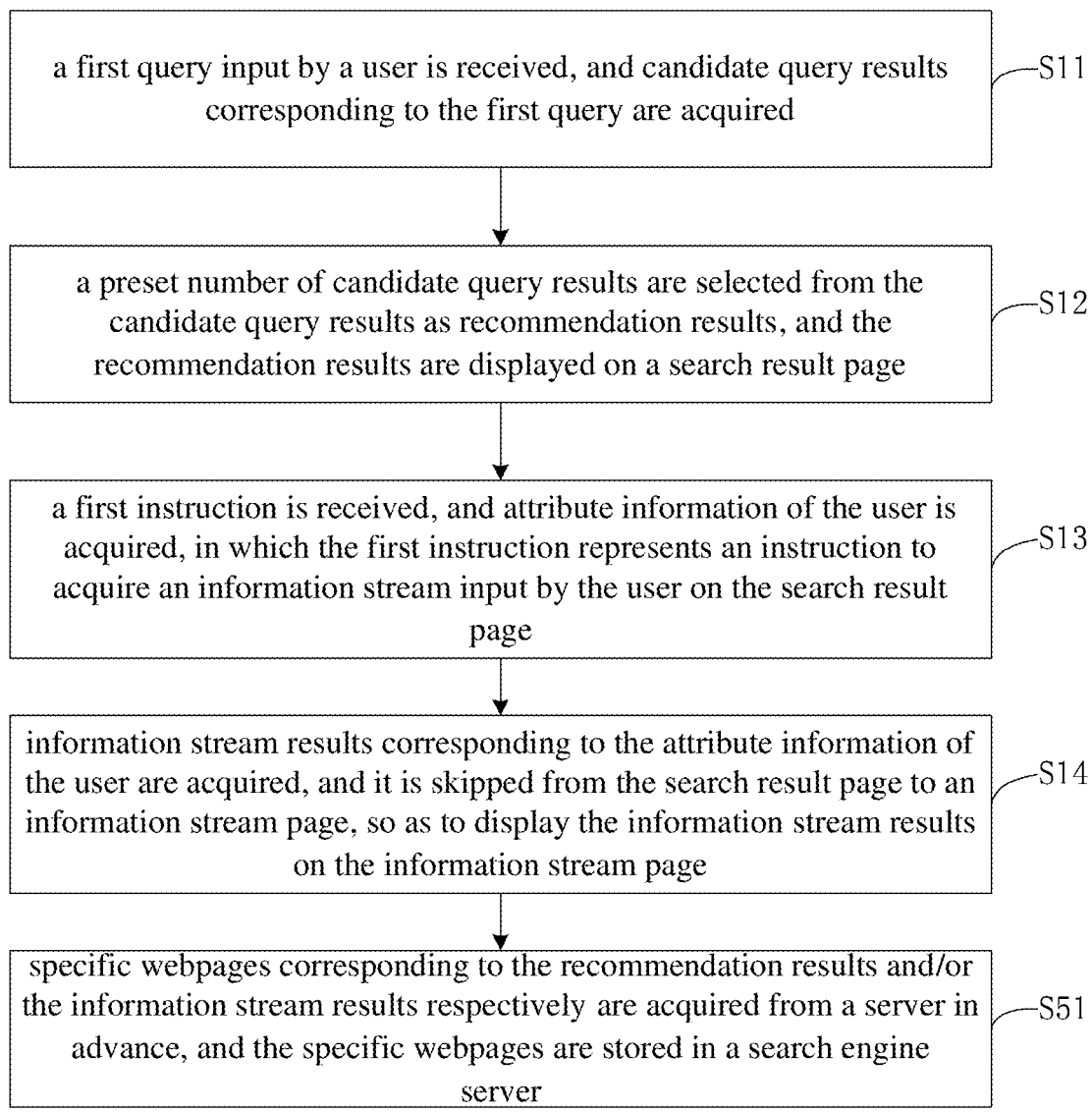
FIG. 5 is a flow chart of a method for displaying recommendation contents according to another embodiment of the present disclosure.

In some embodiments, referring to FIG. 5, the method also includes followings.

At block S51, specific webpages corresponding to the recommendation results and/or the information stream results respectively are acquired from a server, and the specific webpages are stored in a search engine server.

Specifically, the search engine server may acquire specific webpages corresponding to the recommendation results and/or the information stream results respectively from the server. For example, the acquiring manner may include: downloading the specific webpages from the server, parsing the contents of the specific webpages, rendering according to the contents of the specific webpages, and storing the rendered specific webpages in the search engine server.

After the recommendation results and/or information stream results are determined, the specific webpages may be downloaded from the server in advance and stored in the search engine server. For example, the specific webpages may be news webpages referring to "Ni Ping will have an art exhibition in Canada, her artworks are going abroad", and then the specific news webpages may be stored in the search engine server.

Figure 6:
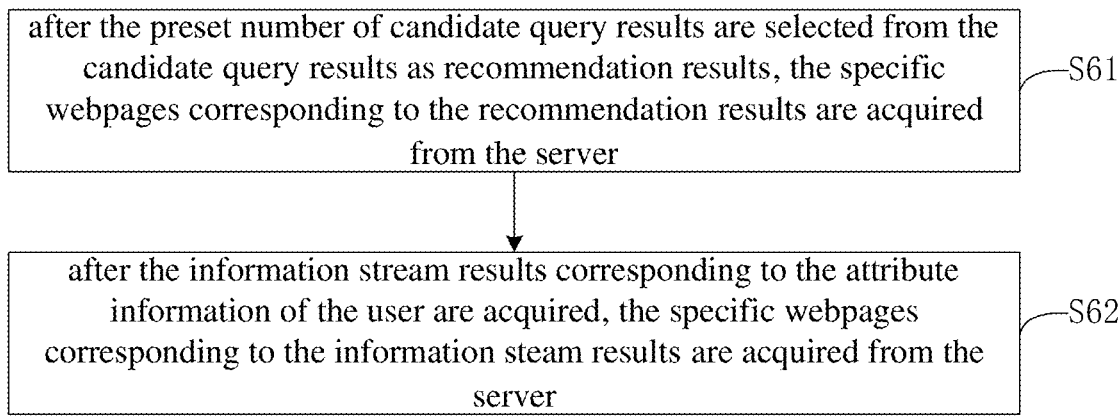
FIG. 6 is a flow chart of a method for displaying recommendation contents according to yet another embodiment of the present disclosure.

In some embodiments, referring to FIG. 6, block S51 may include followings.

At block S61, after the preset number of candidate query results are selected from the candidate query results as recommendation results, the specific webpages corresponding to the recommendation results are acquired from the server.

Referring to FIG. 2, in a case of inputting the query "Ni Ping has an art exhibition in Canada", five recommendation results may be acquired in a descending order according to the relevance between the five recommendation results and the query, which are 1) a piece of news "Ni Ping will have an art exhibition in Canada, her artworks are going abroad"; 2) a piece of news "Ni Ping will launch an art exhibition, the selling prices of her artworks are beyond the prices of professional artists"; 3) a piece of news "[price of painting] one of her paintings was sold by auction for 1.18 million RMB"; 4) a piece of news "[press exposure] young face and shy smile of Ni Ping before 35 years ago"; 5) a piece of news "[previously] Ni Ping loses weight of 10 kilogram for returning CCTV, the audience rating rockets". The search engine server may acquire specific news webpages corresponding respectively to the five recommendation results from the server as the specific webpages.

At block S62, after the information stream results corresponding to the attribute information of the user are acquired, the specific webpages corresponding to the information steam results are acquired from the server.

Referring to FIG. 4, the search engine server may acquire specific news webpages corresponding respectively to the information steam results from the server as the specific webpages.

Figure 7:
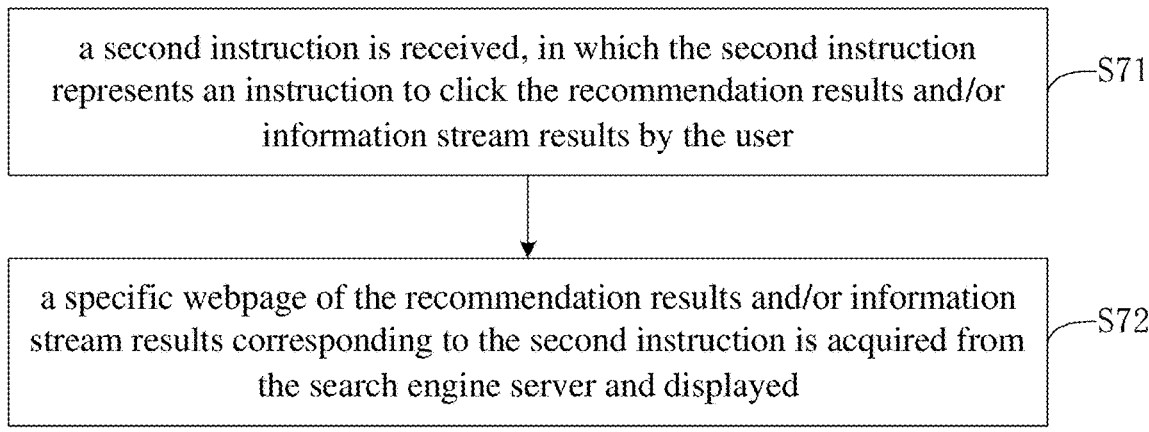
FIG. 7 is a flow chart of a method for displaying recommendation contents according to a still embodiment of the present disclosure.

In some embodiments, referring to FIG. 7, the method may also include followings.

At block S71, a second instruction is received, in which the second instruction represents an instruction to click the recommendation results and/or information stream results by the user.

For example, the user may click the piece of news "Ni Ping will have an art exhibition in Canada, her artworks are going abroad" on the search result page as shown in FIG. 2 to generate the second instruction. Alternatively, the user may click a certain information stream result on the information steam result page as shown in FIG. 4 to generate the second instruction.

At block S72, a specific webpage of the recommendation results and/or information stream results corresponding to the second instruction is acquired from the search engine server and displayed.

At this block, before the specific webpages are accessed, by acquiring the specific webpages corresponding to the recommendation results and/or the information stream results respectively from the server in advance, and by storing the specific webpages in a search engine server, a specific webpage may be acquired directly from the search engine server and displayed to the user when the specific webpage is accessed. Compared to acquiring the webpages from the server, the specific webpages may be displayed immediately by acquiring the specific webpages from the local search engine server, thereby improving user's accessing experience.

Figure 8:
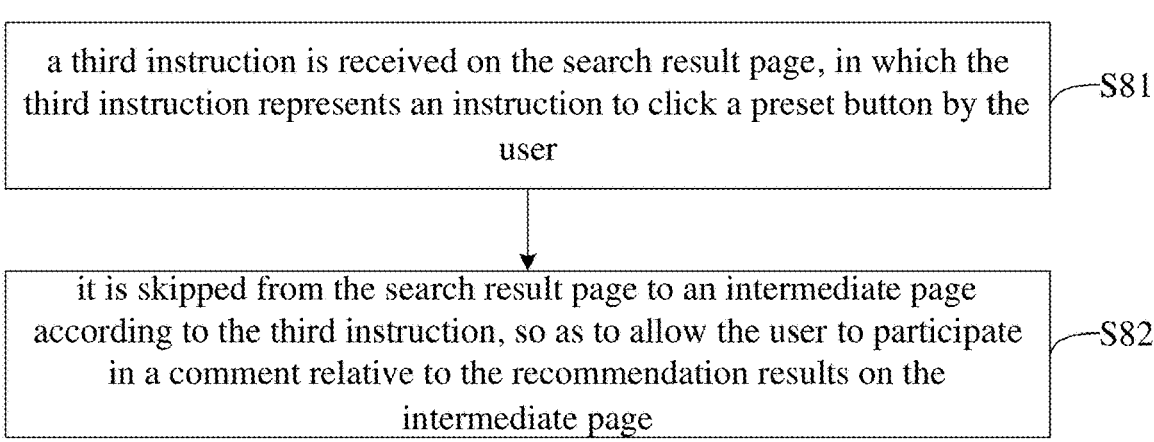
FIG. 8 is a flow chart of a method for displaying recommendation contents according to still another embodiment of the present disclosure.

In some embodiments, referring to FIG. 8, the method may also include followings.

At block S81, a third instruction is received on the search result page, in which the third instruction represents an instruction to click a preset button by the user.

The preset button may be the preset button 25 shown in FIG. 2 or the preset button 35 shown in FIG. 3. For example, when the user clicks the preset button 25 shown in FIG. 2, the third instruction is generated. Alternatively, when the user clicks the preset button 35 shown in FIG. 3, the third instruction is generated.

At block S82, it is skipped from the search result page to an intermediate page according to the third instruction, so as to allow the user to participate in a comment relative to the recommendation results on the intermediate page.

The intermediate page may be a comment page corresponding to the first query input by the user.

For example, when the third instruction is received on the search result page shown in FIG. 2, it may be skipped to the intermediate page, such that the user may participate in a comment relative to the query "Ni Ping has an art exhibition in Canada" on the intermediate page. Alternatively, when the third instruction is received on the search result page shown in FIG. 3, it may be skipped to the intermediate page, such that the user may participate in a comment relative to the query "commemorative coins of Chinese zodiac monkey are issued" on the intermediate page.

By displaying the preset button for the user on the search result page, the user may click the preset button for triggering the webpage to skip to the intermediate page, such that the user may easily participate in a comment relative to the recommendation results on the intermediate page, thereby improving an interactivity between the user and the search engine and the user interactive experience.

Figure 9:
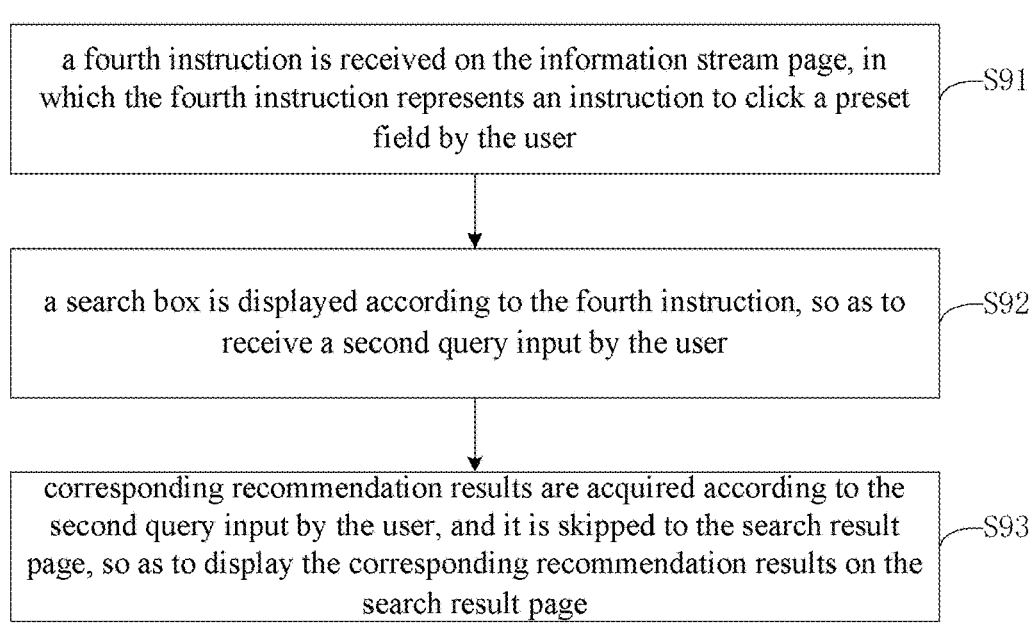
FIG. 9 is a flow chart of a method for displaying recommendation contents according to still yet another embodiment of the present disclosure.

In some embodiments, referring to FIG. 9, the method may also include followings.

At block S91, a fourth instruction is received on the information stream page, in which the fourth instruction represents an instruction to click a preset field by the user.

In embodiments of the present disclosure, the preset field may be a field "hot news" shown in FIG. 4. When the user clicks the field "hot news", the fourth instruction may be generated.

At block S92, a search box is displayed according to the fourth instruction, so as to receive a second query input by the user.

At block S93, corresponding recommendation results are acquired according to the second query input by the user, and it is skipped to the search result page, so as to display the corresponding recommendation results on the search result page.

In related arts, when the user further desires to acquire recommendation results corresponding to other queries, it is necessary to return to the search box and input another query, which is tedious and inconvenient, and the searching process may be interrupted. However, in embodiments of the present disclosure, by clicking the preset field on the information stream page and displaying the search box for receiving a second query input by the user to acquire the corresponding recommendation results of the second query input again, it may be unnecessary for the user to find another query to search again, thereby providing the user a continuous and smooth information viewing experience.

In this embodiment, by receiving a first query input by a user, selecting a preset number of candidate query results from the candidate query results as recommendation results, displaying the recommendation results on a search result page, and receiving an instruction to acquire an information stream input by the user on the search result page, and skipping from the search result page to an information stream page to display the information stream results on the information stream page, the user search experience may be improved effectively.

Figure 10:
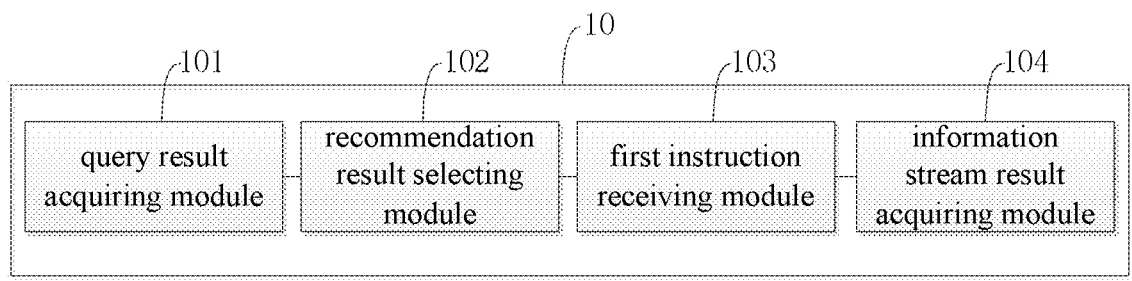
FIG. 10 is a block diagram of an apparatus for displaying recommendation contents according to an embodiment of the present disclosure.

FIG. 10 is a block diagram of an apparatus for displaying recommendation contents according to an embodiment of the present disclosure.

Referring to FIG. 10, the apparatus 10 may include: a query result acquiring module 101, a recommendation result selecting module 102, a first instruction receiving module 103 and an information stream result acquiring module 104.

The query result acquiring module 101 is configured to receive a first query input by a user, and to acquire candidate query results corresponding to the first query.

The recommendation result selecting module 102 is configured to select, from the candidate query results, a preset number of candidate query results as recommendation results, and to display the recommendation results on a search result page.

The first instruction receiving module 103 is configured to receive a first instruction, and to acquire attribute information of the user, in which the first instruction represents an instruction to acquire an information stream input by the user on the search result page.

The information stream result acquiring module 104 is configured to acquire information stream results corresponding to the attribute information of the user, and to skip from the search result page to an information stream page, so as to display the information stream results on the information stream page.

Figure 11:
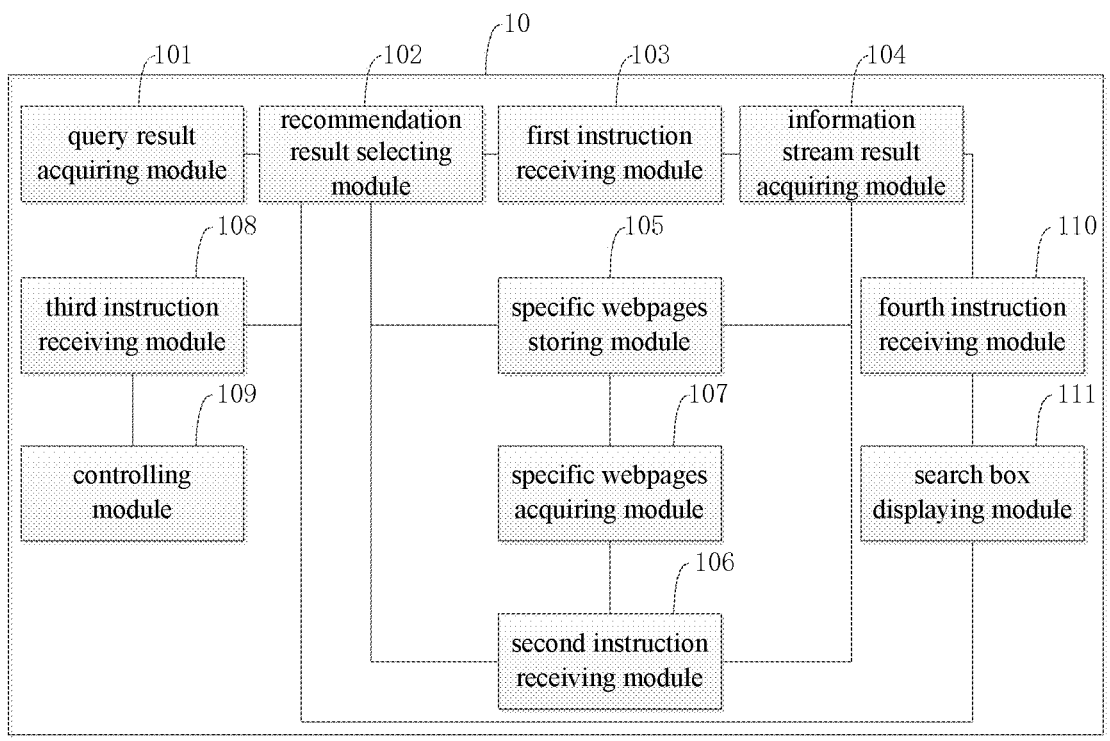
FIG. 11 is a block diagram of an apparatus for displaying recommendation contents according to another embodiment of the present disclosure.

In some embodiments, referring to FIG. 11, the apparatus 10 may also include followings.

A specific webpages storing module 105 is configured to acquire specific webpages corresponding to the recommendation results and/or the information stream results respectively from a server, and to store the specific webpages in a search engine server.

Alternatively, the specific webpages storing module 105 is further configured to: acquire the specific webpages corresponding respectively to the recommendation results from the server after the preset number of candidate query results are selected from the candidate query results as the recommendation results; and to acquire the specific webpages corresponding respectively to the information steam results from the server after the information stream results corresponding to the attribute information of the user are acquired.

A second instruction receiving module 106 is configured to receive a second instruction, in which the second instruction represents an instruction to click the recommendation results and/or information stream results by the user.

A specific webpages acquiring module 107 is configured to acquire, from the search engine server, a specific webpage of the recommendation results and/or information stream results corresponding to the second instruction, and to display the specific webpage.

A third instruction receiving module 108 is configured to receive a third instruction on the search result page, in which the third instruction represents an instruction to click a preset button by the user.

A controlling module 109 is configured to skip from the search result page to an intermediate page according to the third instruction, such that the user is allowed to participate in a comment relative to the recommendation results on the intermediate page.

A fourth instruction receiving module 110 is configured to receive a fourth instruction on the information stream page, in which the fourth instruction represents an instruction to click a preset field by the user.

A search box displaying module 111 is configured to display a search box according to the fourth instruction, so as to receive a second query input by the user.

Alternatively, the recommendation result acquiring module 102 is further configured to acquire corresponding recommendation results according to the second query input by the user, and to skip to the search result page, so as to display the corresponding recommendation results on the search result page.

It should be noted that the descriptions of the method for displaying recommendation contents in afore-mentioned embodiments are also suitable for the apparatus 10 for displaying recommendation contents, which will not be described in detail herein.

In this embodiment, by receiving a first query input by a user, selecting a set number of candidate query results from the candidate query results as recommendation results, displaying the recommendation results may be displayed on a search result page, and receiving an instruction to acquire an information stream input by the user on the search result page, and skipping from the search result page to an information stream page to display the information stream results on the information stream page, the user search experience may be improved effectively.

Embodiments of the present disclosure also provide an electronic device, including: one or more processors; a memory; one or more programs stored in the memory, when executed by the one or more processors, configured to perform the acts of: receiving a first query input by a user, and acquiring candidate query results corresponding to the first query; selecting, from the candidate query results, a preset number of candidate query results as recommendation results, and displaying the recommendation results on a search result page; receiving a first instruction, and acquiring attribute information of the user, wherein the first instruction represents an instruction to acquire an information stream input by the user on the search result page; and acquiring information stream results corresponding to the attribute information of the user, and skipping from the search result page to an information stream page, so as to display the information stream results on the information stream page.

Embodiments of the present disclosure also provide a non-transitory computer storage medium storing one or more modules, when the one or more modules are executed, configured to perform the acts of: receiving a first query input by a user, and acquiring candidate query results corresponding to the first query; selecting, from the candidate query results, a preset number of candidate query results as recommendation results, and displaying the recommendation results on a search result page; receiving a first instruction, and acquiring attribute information of the user, wherein the first instruction represents an instruction to acquire an information stream input by the user on the search result page; and acquiring information stream results corresponding to the attribute information of the user, and skipping from the search result page to an information stream page, so as to display the information stream results on the information stream page.

It should be noted that terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

It will be understood that, the flow chart or any process or method described herein in other manners may represent a module, segment, or portion of code that comprises one or more executable instructions to implement the specified logic function(s) or that comprises one or more executable instructions of the steps of the progress. And the scope of a preferred embodiment of the present disclosure includes other implementations in which the order of execution may differ from that which is depicted in the flow chart, which should be understood by those skilled in the art.

It should be understood that the various parts of the present disclosure may be realized by hardware, software, firmware or combinations thereof. In the above embodiments, a plurality of steps or methods may be stored in a memory and achieved by software or firmware executed by a suitable instruction executing system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable memory medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable memory medium.

The above-mentioned memory medium may be a read-only memory, a magnetic disc, an optical disc, etc.

Reference throughout this specification to "one embodiment", "some embodiments," "an embodiment", "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated that the above embodiments are explanatory and cannot be construed to limit the present disclosure, and changes, alternatives, and modifications can be made in the embodiments without departing from scope of the present disclosure by those skilled in the art.

What is claimed is:

1. A method for displaying recommendation contents, comprising:
    receiving a first query statement input by a user in a search box, and acquiring candidate query results corresponding to the first query statement;
    selecting, from the candidate query results, a preset number of candidate query results as recommended results, and displaying the recommended results on a search result page;
    receiving a first instruction, and acquiring attribute information of the user, wherein the first instruction represents an instruction to acquire an information stream triggered by the user according to a preset control method on an operating area of the search result page;
    acquiring information stream results corresponding to the attribute information of the user using the first query statement, and skipping from the search result page to an information stream page, so as to display the information stream results on the information stream page;
    receiving a fourth instruction on the information stream page, wherein the fourth instruction represents an instruction to click a preset field by the user;
    displaying a search box according to the fourth instruction, so as to receive a second query input by the user; and
    acquiring corresponding recommendation results according to the second query input by the user, and skipping to the search result page, so as to display the corresponding recommendation results on the search result page.

2. The method according to claim 1, further comprising:
    acquiring specific webpages corresponding to the recommendation results and/or the information stream results respectively from a server, and storing the specific webpages in a search engine server.

3. The method according to claim 2, further comprising:
    receiving a second instruction, wherein the second instruction represents an instruction to click the recommendation results and/or the information stream results by the user; and
    acquiring, from the search engine server, a specific webpage of the recommendation results and/or information stream results corresponding to the second instruction, and displaying the specific webpage.

4. The method according to claim 3, wherein acquiring specific webpages corresponding to the recommendation results and/or the information stream results respectively from a server comprises:
    acquiring the specific webpages corresponding respectively to the recommendation results from the server after the preset number of candidate query results are selected from the candidate query results as the recommendation results; and/or
    acquiring the specific webpages corresponding respectively to the information steam results from the server after the information stream results corresponding to the attribute information of the user are acquired.

5. The method according to claim 3, further comprising:
    receiving a third instruction on the search result page, wherein the third instruction represents an instruction to click a preset button by the user; and
    skipping from the search result page to an intermediate page according to the third instruction, so as to allow the user to participate in a comment relative to the recommendation results on the intermediate page.

6. The method according to claim 2, wherein acquiring specific webpages corresponding to the recommendation results and/or the information stream results respectively from a server comprises:
    acquiring the specific webpages corresponding respectively to the recommendation results from the server after the preset number of candidate query results are selected from the candidate query results as the recommendation results; and/or
    acquiring the specific webpages corresponding respectively to the information steam results from the server after the information stream results corresponding to the attribute information of the user are acquired.

7. The method according to claim 6, further comprising:
    receiving a third instruction on the search result page, wherein the third instruction represents an instruction to click a preset button by the user; and
    skipping from the search result page to an intermediate page according to the third instruction, so as to allow the user to participate in a comment relative to the recommendation results on the intermediate page.

8. The method according to claim 2, further comprising:
    receiving a third instruction on the search result page, wherein the third instruction represents an instruction to click a preset button by the user; and
    skipping from the search result page to an intermediate page according to the third instruction, so as to allow the user to participate in a comment relative to the recommendation results on the intermediate page.

9. The method according to claim 1, further comprising:
    receiving a third instruction on the search result page, wherein the third instruction represents an instruction to click a preset button by the user; and
    skipping from the search result page to an intermediate page according to the third instruction, so as to allow the user to participate in a comment relative to the recommendation results on the intermediate page.

10. An electronic device, comprising:
    one or more processors;
    a memory;
    one or more programs stored in the memory, that when executed by the one or more processors, cause the one or more processors to perform acts of:
        receiving a first query statement input by a user in a search box, and acquiring candidate query results corresponding to the first query statement;
        selecting, from the candidate query results, a preset number of candidate query results as recommended results, and displaying the recommended results on a search result page;
        receiving a first instruction, and acquiring attribute information of the user, wherein the first instruction represents an instruction to acquire an information stream triggered by the user according to a preset control method on an operating area of the search result page;
        acquiring information stream results corresponding to the attribute information of the user using the first query statement, and skipping from the search result page to an information stream page, so as to display the information stream results on the information stream page;

receive a fourth instruction on the information stream page, wherein the fourth instruction represents an instruction to click a preset field by the user;

display a search box according to the fourth instruction, so as to receive a second query input by the user; and acquire corresponding recommendation results according to the second query input by the user, and skip to the search result page, so as to display the corresponding recommendation results on the search result page.

11. The electronic device according to claim 10, where the one or more processors are further caused to:

acquire specific webpages corresponding to the recommendation results and/or the information stream results respectively from a server, and store the specific webpages in a search engine server.

12. The electronic device according to claim 11, where the one or more processors are further caused to:

receive a second instruction, wherein the second instruction represents an instruction to click the recommendation results and/or the information stream results by the user; and acquire, from the search engine server, a specific webpage of the recommendation results and/or information stream results corresponding to the second instruction, and display the specific webpage.

13. The electronic device according to claim 11, wherein the one or more processors are caused to acquire specific webpages corresponding to the recommendation results and/or the information stream results respectively from a server by:

acquiring the specific webpages corresponding respectively to the recommendation results from the server after the preset number of candidate query results are selected from the candidate query results as the recommendation results; and/or acquiring the specific webpages corresponding respectively to the information steam results from the server after the information stream results corresponding to the attribute information of the user are acquired.

14. The electronic device according to claim 10, where the one or more processors are further caused to:

receive a third instruction on the search result page, wherein the third instruction represents an instruction to click a preset button by the user; and skip from the search result page to an intermediate page according to the third instruction, so as to allow the user to participate in a comment relative to the recommendation results on the intermediate page.

15. A non-transitory computer storage medium storing one or more modules, when the one or more modules are executed, configured to perform the method including:

receiving a first query statement input by a user in a search box, and acquiring candidate query results corresponding to the first query statement;

selecting, from the candidate query results, a preset number of candidate query results as recommended results, and displaying the recommended results on a search result page;

receiving a first instruction, and acquiring attribute information of the user, wherein the first instruction represents an instruction to acquire an information stream triggered by the user according to a preset control method on an operating area of the search result page;

acquiring information stream results corresponding to the attribute information of the user using the first query statement, and skipping from the search result page to an information stream page, so as to display the information stream results on the information stream page;

receiving a fourth instruction on the information stream page, wherein the fourth instruction represents an instruction to click a preset field by the user;

displaying a search box according to the fourth instruction, so as to receive a second query input by the user; and acquiring corresponding recommendation results according to the second query input by the user, and skipping to the search result page, so as to display the corresponding recommendation results on the search result page.

* * * * *